United States Patent
Kimura et al.

(10) Patent No.: US 7,843,612 B2
(45) Date of Patent: Nov. 30, 2010

(54) IMAGE SENSOR UNIT AND METHOD OF MANUFACTURING THE IMAGE SENSOR UNIT, AND IMAGE-READING APPARATUS

(75) Inventors: Koji Kimura, Saitama-ken (JP); Hideo Kiyota, Gunma-ken (JP)

(73) Assignee: Canon Components, Inc., Saitama-ken (JP)

( * ) Notice: Subject to any disclaimer, the term of this patent is extended or adjusted under 35 U.S.C. 154(b) by 0 days.

(21) Appl. No.: 12/695,538

(22) Filed: Jan. 28, 2010

(65) Prior Publication Data

US 2010/0128330 A1    May 27, 2010

Related U.S. Application Data

(63) Continuation of application No. PCT/JP2009/052694, filed on Feb. 17, 2009.

(30) Foreign Application Priority Data

Feb. 19, 2008    (WO) ................ PCT/JP2008/052772

(51) Int. Cl.
*H04N 1/04*    (2006.01)

(52) U.S. Cl. ....................... 358/474; 358/475; 358/509; 250/208.1; 250/234

(58) Field of Classification Search ................. 358/474, 358/482, 483, 475, 509, 400, 494, 523, 514, 358/471; 250/208.1, 234–236, 216, 239
See application file for complete search history.

(56) References Cited

U.S. PATENT DOCUMENTS 4,707,615 A * 11/1987 Hosaka ........................ 358/513
7,085,023 B2 * 8/2006 Okamoto et al. ............ 358/471

(Continued)

FOREIGN PATENT DOCUMENTS

| JP | 2-113662 | 4/1990 |
|---|---|---|
| JP | 4-286458 | 10/1992 |
| JP | 5-002122 | 1/1993 |
| JP | 6-164829 | 6/1994 |
| JP | 7-142691 | 6/1995 |

OTHER PUBLICATIONS

European International Search Report dated Apr. 7, 2007, in related corresponding Japanese International Appln. No. PCT/JP2009/052694.

*Primary Examiner*—Negussie Worku
(74) *Attorney, Agent, or Firm*—Fitzpatrick, Cella Harper & Scinto

(57) ABSTRACT

An image sensor unit includes a frame storing a linear illuminator that linearly illuminates a document, a rod lens array is used to form an image of light reflected from the document irradiated by the linear illuminator, and a printed circuit board on which a light-receiving sensor that converts light whose image has been formed by the rod lens array into an electrical signal is mounted. In the frame, a lens storage compartment, a linear illuminator storage compartment, and the linear illuminator are adjacently arranged substantially in parallel to each other in a longitudinal direction, with an inter-compartment portion formed in the frame interposed therebetween. At least one pin insertion opening is formed that extends from an inner wall of the lens storage compartment opposing the inter-compartment portion into an outside of the frame and through which a pressing pin is inserted, and in the inter-compartment portion, a face defining the lens storage compartment is formed as a vertical reference face with which a side plate of the rod lens array is brought into close contact for fixing. A notch used for applying an adhesive to the side plate of the rod lens array is disposed corresponding to the pin insertion opening and is formed to be open from the lens storage compartment to the linear illuminator storage compartment.

7 Claims, 14 Drawing Sheets

U.S. PATENT DOCUMENTS

| | | | |
|---|---|---|---|
| 7,177,056 B2 * | 2/2007 | Matsumoto | 358/474 |
| 7,428,081 B2 * | 9/2008 | Yamauchi | 358/474 |
| 7,471,428 B2 * | 12/2008 | Ohara et al. | 358/497 |
| 2004/0165226 A1 * | 8/2004 | Tomita et al. | 358/474 |
| 2005/0088705 A1 * | 4/2005 | Okamoto et al. | 358/474 |
| 2006/0044625 A1 * | 3/2006 | Ohara | 358/474 |
| 2006/0158696 A1 * | 7/2006 | Amimoto | 358/474 |
| 2008/0192306 A1 * | 8/2008 | Lee et al. | 358/483 |
| 2008/0286518 A1 | 11/2008 | Kiyota | |
| 2009/0310190 A1 * | 12/2009 | Ikeda | 358/474 |

* cited by examiner

F I G. 10A
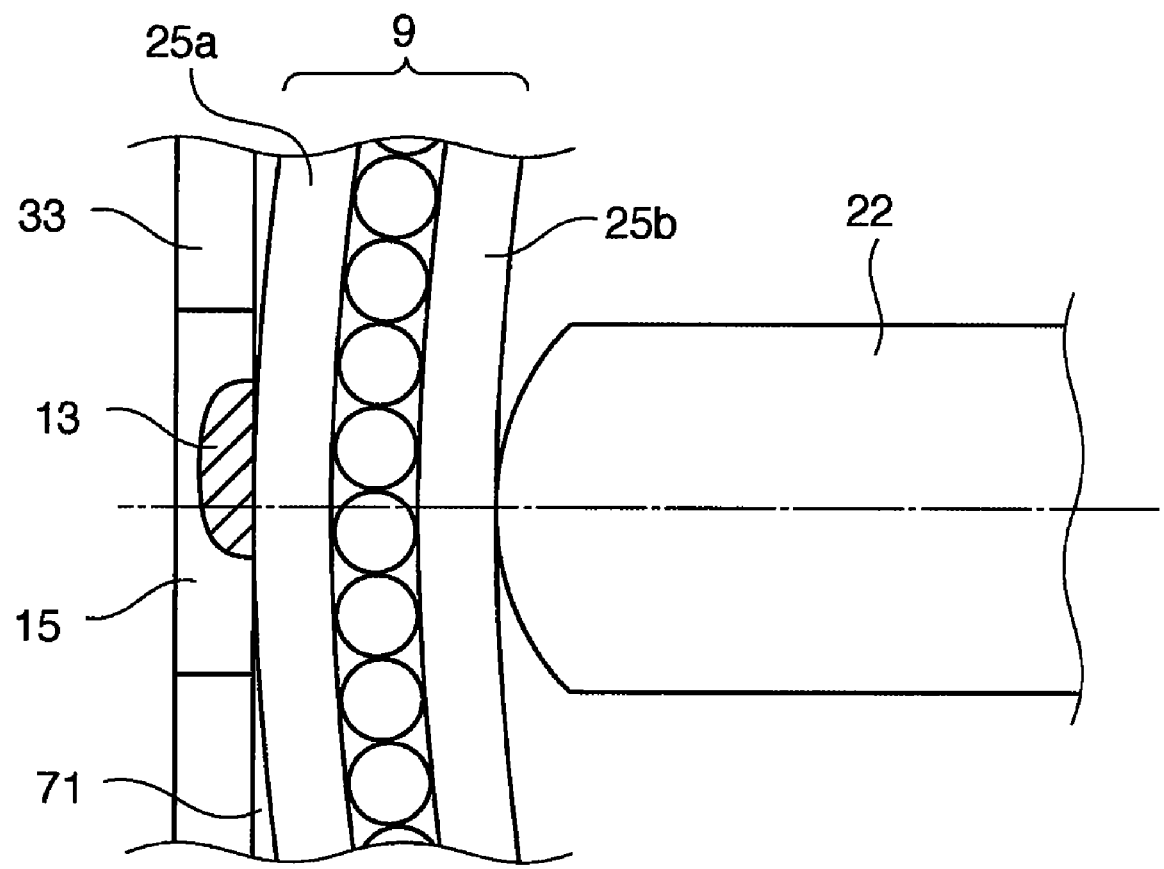

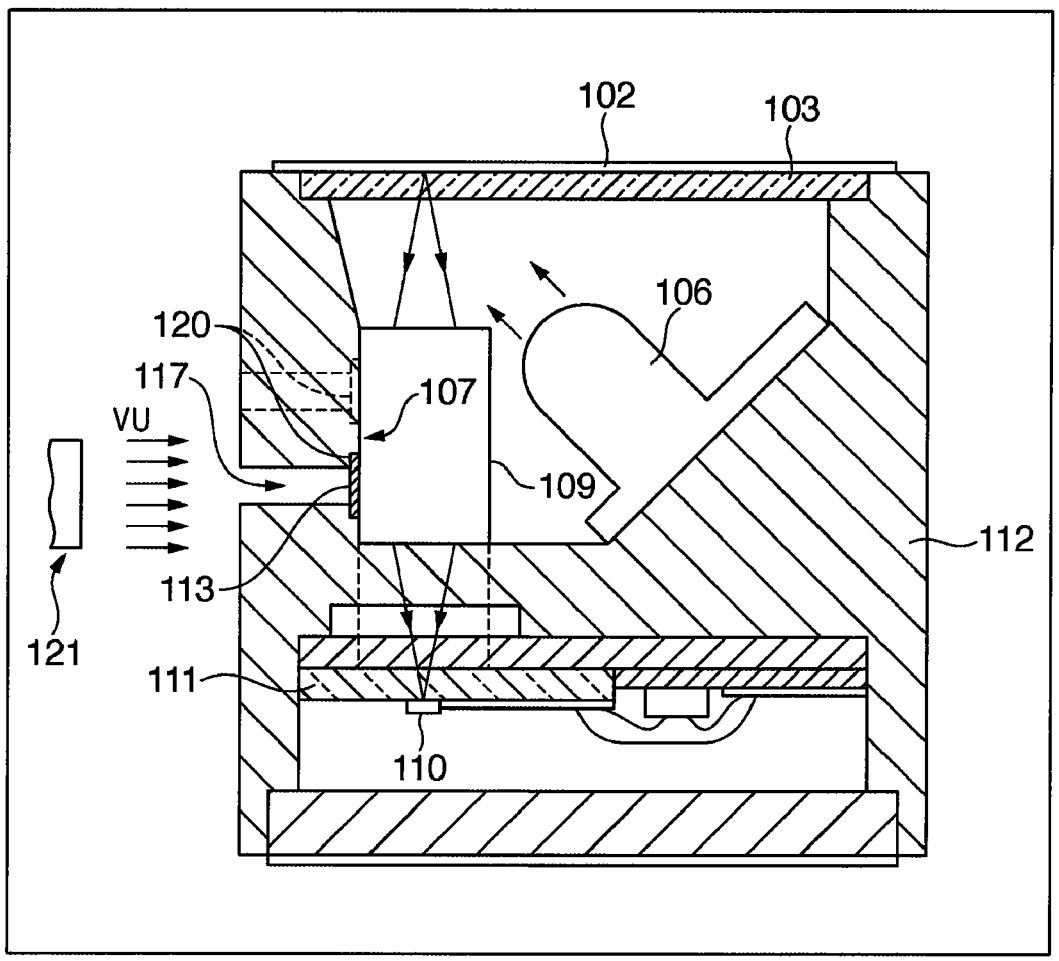
F I G. 12

IMAGE SENSOR UNIT AND METHOD OF MANUFACTURING THE IMAGE SENSOR UNIT, AND IMAGE-READING APPARATUS

This application is a continuation of PCT/JP2009-052694, filed Feb. 17, 2009.

TECHNICAL FIELD

The present invention relates to an image sensor unit, a method of manufacturing the image sensor unit, and an image-reading apparatus using the image sensor unit that can be used, for example, in a facsimile, a copying machine, a scanner, and the like.

BACKGROUND ART

For example, in an image-reading apparatus used in a facsimile, a copying machine, a scanner, and the like, a contact-type image sensor that reads image information on a document at the same magnification is used.

FIG. 11A depicts a view illustrating an example of a schematic cross-section showing the positional relationship between a conventional contact-type image sensor unit (hereinafter, abbreviated as a "CIS unit") 101 and a document 102 that is in contact with a transparent cover glass 103 in an image-reading apparatus (see Patent document 1).

In FIG. 11A, the CIS unit 101 has a linear illuminator 106 including an LED array that illuminates the document 102, and a rod lens array 109 that forms an image of light reflected from the document 102. Furthermore, a light-receiving sensor 110 in which photoelectric conversion elements for photoelectrically converting light whose image has been formed by the rod lens array 109 are arranged, a printed circuit board 111 on which the light-receiving sensor 110 and the like are mounted, and a frame 112 for holding these constituent elements are included.

In the CIS unit 101, it is desired that the distance from the rod lens array 109 to the image sensor array 110 is set in an optically accurate manner and fixed, and that an optical path line from a reading line on the document 102 illuminated by the linear illuminator 106 to the light-receiving sensor 110 and an optical axis of the rod lens array 109 are caused to accurately match each other by positioning and fixing these constituent elements on the frame 112.

In the conventional example shown in FIGS. 11A and 11B, the rod lens array 109 is positioned and fixed as follows: first, a spring 119 disposed between the frame 112 and the rod lens array 109 is caused to press against one side face of the rod lens array 109, and the other side face of the rod lens array 109 is brought into contact with projecting portions 115 arranged at a corresponding face of the frame 112, and, thus, the rod lens array 109 is positioned. Next, an adhesive 113 is caused to permeate through a gap between the frame 112 and the side face of the rod lens array 109 formed at the projecting portions 115, and thus, the constituent elements are adhered and fixed to each other.

Conversely, in the conventional example in FIG. 12, instead of a method in which the rod lens array 109 is fixed with a set screw screwed from a screw hole that is formed in the frame 112, a method in which an adhesive made of an ultraviolet-curable resin is used to fix the rod lens array 109 to the frame 112 is shown (Patent document 2). Here, FIG. 12 is a cross-sectional view of the CIS unit taken along a cutting line that is perpendicular to the longitudinal direction as in FIGS. 11A and 11B, and constituent elements in this drawing having the same function or name as that in FIGS. 11A and 11B are denoted by the same reference numerals.

In this conventional example, a vertical face 107 that is disposed on a frame (referred to as a "chassis" in Patent document 2), with which the side face of the rod lens array 109 is brought into contact for positioning, has a plurality of grooves 120 that extend in the longitudinal direction, and the ultraviolet-curable adhesive 113 is applied to the grooves 120. Subsequently, the rod lens array 109 is pressed against the vertical face so as to be pressed after positional adjustment, ultraviolet rays are irradiated from an ultraviolet-irradiating apparatus 121 through through-holes 117 for ultraviolet irradiation, and, thus, the adhesive 113 is cured and the constituent elements are fixed.

PRIOR ART DOCUMENTS

Patent document 1: Japanese Patent Laid Open No. 06-164829

Patent document 2: Japanese Patent Laid Open No. 02-113662

DISCLOSURE OF INVENTION

Problems that the Invention is to Solve

Conventionally, when a rod lens array is positioned on a frame and fixed with an adhesive or the like, the rod lens array is supported until the adhesive is cured, by using a spring member that is a constituent element forming the CIS unit, or by processing the frame into a shape having a spring function using the elasticity of the frame itself. Furthermore, a screw is inserted through a hole formed in the frame, and directly fixes the rod lens array. As a result, the number of assembly components and the assembly time increase, and the processing cost is difficult to reduce.

Furthermore, in Patent document 2, after the adhesive is applied to the grooves 120, the rod lens array is pressed against the vertical face, but no method is clearly disclosed in which support for the rod lens is secured until curing of the adhesive proceeds and fixing is completed. Furthermore, in FIG. 12, an originally formed inter-compartment portion formed as part of the frame between a rod lens array storage compartment and an LED array storage compartment is eliminated, and, depending on the positional state of the rod lens array, light from the LED array may travel as stray light via the through-hole 117 and reach the light-receiving sensor 110. Furthermore, although an ultraviolet-curable adhesive, which is advantageous in shortening the curing time, is used, irradiated ultraviolet rays cannot reach all of the applied adhesive, and, thus, an uncured portion remains.

The present invention solves this sort of problem, and it is an object thereof to provide a CIS unit including a frame having a structure in which a rod lens array can be fixed economically and with good optical quality and good precision in the optical position, without using an assembly component, such as a spring, or complicated processing of the frame into a shape having a function similar to that of such an assembly component.

A further object of the present invention is to provide a CIS unit having a frame structure in which, when an ultraviolet-curable adhesive, which is advantageous in shortening the curing time, is used to adhere and fix a rod lens array and a frame, irradiated ultraviolet rays can sufficiently reach the entire applied adhesive.

Means of Solving the Problems

In order to achieve the above-described objects, an image sensor unit according to an aspect of the present invention has the following configuration. That is to say, the present invention is directed to an image sensor unit having a frame storing: a linear illuminator that linearly illuminates a document; a rod lens array that is used to form an image of light reflected from the document irradiated by the linear illuminator; and a printed circuit board on which a light-receiving sensor that converts light whose image has been formed by the rod lens array into an electrical signal is mounted;

wherein, in the frame, a lens storage compartment and a linear illuminator storage compartment that are formed for respectively storing and fixing the rod lens array and the linear illuminator are adjacently arranged substantially in parallel to each other in a longitudinal direction, with an inter-compartment portion formed in the frame interposed therebetween, at least one pin insertion opening is formed that extends from an inner wall of the lens storage compartment opposing the inter-compartment portion into an outside of the frame and through which a pressing pin is inserted, and in the inter-compartment portion, a face defining the lens storage compartment is formed as a vertical reference face with which a side plate of the rod lens array is brought into close contact for fixing, and a notch that is used for applying an adhesive to the side plate of the rod lens array and that is disposed corresponding to the pin insertion opening is formed so as to be open from the lens storage compartment to the linear illuminator storage compartment.

In order to achieve the above-described objects, an image-reading apparatus according to an aspect of the present invention has the following configuration. That is to say, the present invention is directed to an image-reading apparatus having the image sensor unit according to claim 5 in which the frame is made of a polycarbonate resin, wherein the image sensor unit and a document are moved relative to each other to read an image on the document.

In order to achieve the above-described objects, a method of manufacturing an image sensor unit according to an aspect of the present invention has the following configuration. That is to say, the present invention is directed to a method of manufacturing an image sensor unit having a frame storing a linear illuminator that linearly illuminates a document, a rod lens array that is used to form an image of light reflected from the document irradiated by the linear illuminator, and a light-receiving sensor that converts light whose image has been formed by the rod lens array into an electrical signal, comprising:

in the frame, adjacently arranging a lens storage compartment and a linear illuminator storage compartment that are formed for respectively storing and fixing the rod lens array and the linear illuminator, substantially in parallel to each other in a longitudinal direction, with an inter-compartment portion formed in the frame interposed therebetween;

storing the rod lens array in the lens storage compartment, and then pressing a first side plate of the rod lens array with a pressing pin inserted through a pin insertion opening that extends from an inner wall of the lens storage compartment opposing the inter-compartment portion into an outside of the frame and that is disposed such that the pressing pin is inserted therethrough;

bringing a second side plate of the rod lens array into close contact with a vertical reference face that is a face of the inter-compartment portion defining the lens storage compartment and holding the second side plate; and fixing an inner wall of the notch and a portion of the side plate exposed through the notch functioning as adhesion faces with an adhesive.

EFFECTS OF THE INVENTION

According to the present invention, a pin insertion opening is provided in order to press a rod lens array against a vertical reference face formed on a frame, and, thus, during the assembly operation of a CIS unit, a pressing pin can be inserted through the pin insertion opening, and the rod lens array can be properly pressed against the vertical reference face and supported until an adhesive is cured. As a result, conventionally used assembly components, such as a spring or a screw, processing of the frame into a shape having a spring function, or the like is no longer necessary.

Furthermore, a notch as a place where an adhesive is applied is formed in the frame so as to be open from a lens storage compartment to a linear illuminator storage compartment, and, thus, the operations that use tools, such as a dispenser for supplying and applying the adhesive, a flexible light guide from an ultraviolet spot irradiation apparatus for curing the applied ultraviolet-curable adhesive, or the like can be performed using a space of the linear illuminator apparatus storage compartment before a storage target is stored. Accordingly, a space sufficient for movement and direction changes in achieving the usage objects of these tools can be secured, and the assembly operation can be performed using a space of the linear illuminator apparatus storage compartment before a storage target is stored. Accordingly, the operation is easy to perform more efficiently and to automate.

Furthermore, the position and the structure of the notches are set so as to secure a working space in which ultraviolet rays irradiated from the light guide of an ultraviolet spot irradiation apparatus reach all of the ultraviolet-curable adhesive applied to the notches. Accordingly, the amount of residual uncured adhesive is reduced, and the adhesive can be economically used. As a result, the adhesive is sufficiently cured at the notches and the side plate of the rod lens array functioning as adhesion faces, and the rod lens array can be fixed to the reference face that is formed on the frame with good positional precision, and a CIS unit that has economical and excellent optical characteristics can be produced.

Other features and advantages of the present invention will become clear from the following description with reference to the attached drawings. Here, in the attached drawings, the same or similar constituent elements are denoted by the same reference numerals.

BRIEF DESCRIPTION OF DRAWINGS

FIGS. 10A and 10B depict views illustrating Embodiment 2 regarding the positional relationship between a position at which the pressing pin is in contact with the rod lens array, and the notch.

FIG. 12 depicts a view showing a cross-section of a CIS unit according to a conventional technology having an ultraviolet-irradiation through-hole for curing an adhesive with ultraviolet rays.

MODE FOR CARRYING OUT THE INVENTION

Hereinafter, embodiments of the present invention will be described in detail with reference to the attached drawings. Here, it will be understood that the following embodiments are not intended to limit the present invention set forth in the claims, and that not all of the combinations of features described in the embodiments are necessarily essential with respect to the means to solve the problems according to the present invention.

Figure 1:
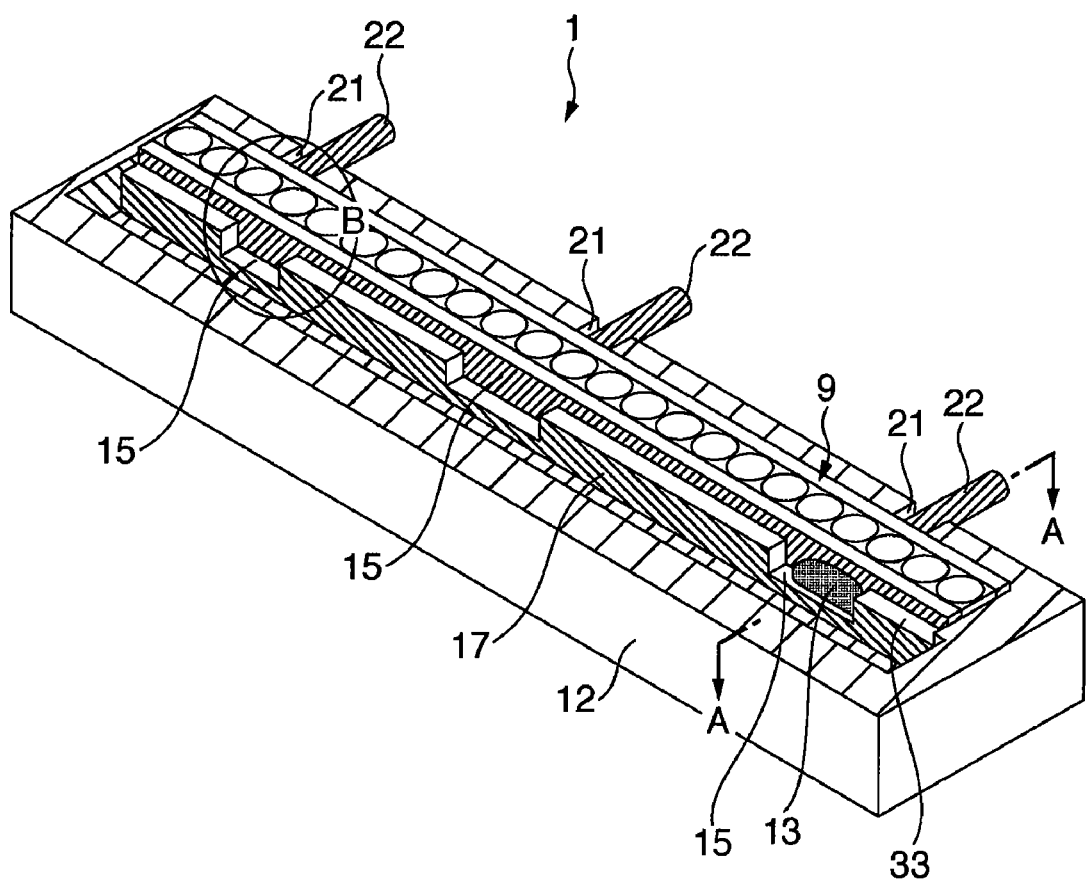
FIG. 1 depicts a perspective view showing the structure of a frame in a contact-type image sensor unit (CIS unit) according to an embodiment of the present invention, and a state in which a side plate of a rod lens array is pressed and fixed with pressing pins.

FIG. 1 is a perspective view showing the structure of a frame 12 in a contact-type image sensor unit (CIS unit) 1 according to an embodiment of the present invention, and a state in which a side plate of a rod lens array 9 is pressed and supported by pressing pins 22. Here, a completed view of the CIS unit 1 is a view obtained by excluding the pressing pins 22 from the state of FIG. 1.

Figure 2:
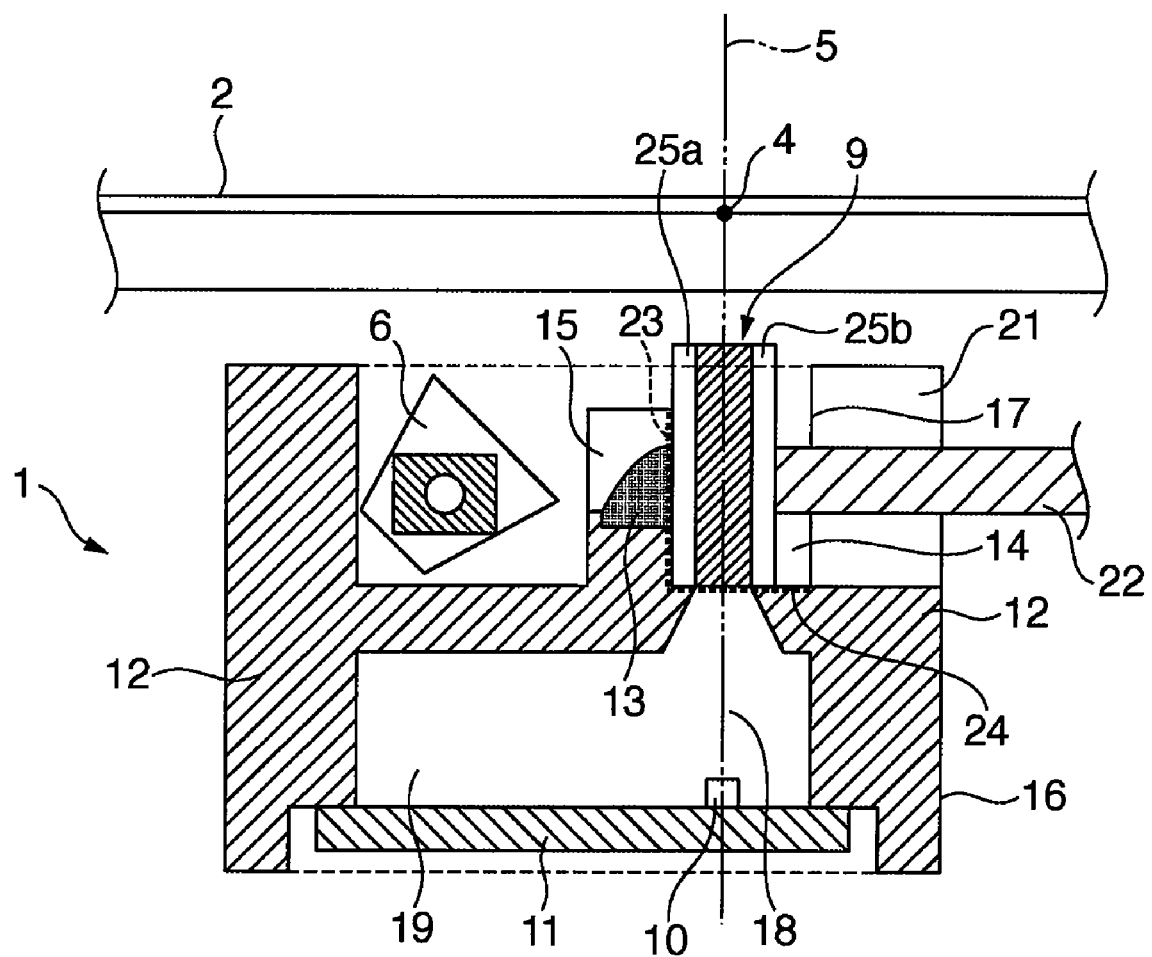
FIG. 2 depicts a view illustrating a cross-section of the CIS unit taken along line A-A in FIG. 1, and the relationship with a reading position of a document when the CIS unit is assembled in an image-reading apparatus.

FIG. 2 is a view illustrating a cross-section of the CIS unit 1 taken along line A-A in FIG. 1, and the relationship with a reading position of a document when the CIS unit is assembled in an image-reading apparatus.

Figure 3:
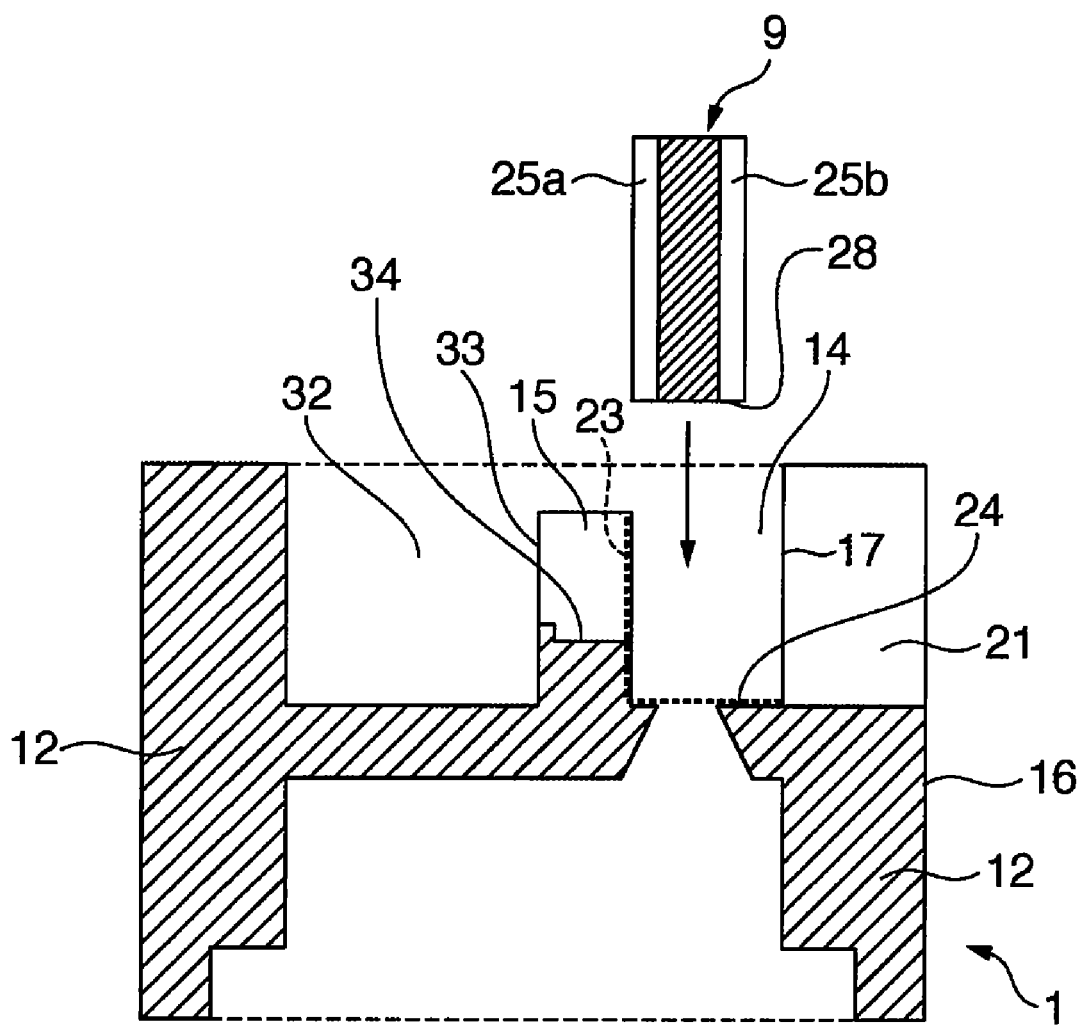
FIG. 3 depicts a conceptual cross-sectional view illustrating a state in which the rod lens array in this embodiment is stored in a lens storage compartment disposed in the frame.

FIG. 3 is a conceptual cross-sectional view illustrating a state in which the rod lens array 9 according to this embodiment is stored in a lens storage compartment 14 disposed in the frame 12.

In FIG. 2, the CIS unit 1 has a linear illuminator 6 that illuminates a reading line 4 and a position near the reading line 4, and the rod lens array 9 that forms an image of light illuminated from the linear illuminator 6 and reflected by a document 2. Furthermore, a light-receiving sensor 10 in which photoelectric conversion elements for generating an electrical signal by photoelectrically converting light whose image has been formed by the rod lens array 9 are arranged, a printed circuit board 11 on which the light-receiving sensor 10 and the like are mounted, and the frame 12 for holding these constituent elements are included.

In the CIS unit 1 according to this embodiment, a second side plate 25a of the rod lens array 9 is brought into contact with and positioned on a vertical reference face 23 that is formed on the frame 12 such that an optical path line 18 from the reading line 4 on the document 2 to the light-receiving sensor 10 and an optical axis 5 of the rod lens array 9 match each other. Furthermore, in order to adjust a focal point corresponding to the light-receiving sensor 10, an under surface 28 (FIG. 3) of the rod lens array 9 is brought into contact with, and positioned and supported on a horizontal reference face 24, which is a bottom face of the lens storage compartment 14, and fixed with an adhesive. Accordingly, a CIS unit 1 that has good optical precision, that has a smaller number of components, and that is manufactured with good work efficiency is provided. In order to achieve this object, embodiments will be described below.

Embodiment 1

As shown in FIG. 3, the frame 12 is formed such that the lens storage compartment 14 formed for storing and fixing the rod lens array 9 and a linear illuminator storage compartment 32 formed for storing and fixing the linear illuminator 6 are adjacently formed substantially in parallel to each other in the longitudinal direction of the CIS unit 1 with an inter-compartment portion 33 interposed therebetween. Pin insertion openings 21 are openings through which the pressing pins 22 operated in an assembling jig 26 (FIG. 4), which is a tool for assembling the rod lens array 9, are inserted, and are formed at main points that are open from an inner wall 17 of the lens storage compartment 14 opposing the vertical reference face 23 to a side face 16 of the frame. Furthermore, notches 15 that are used for applying an adhesive are formed as notches that are linked from the lens storage compartment 14 to the linear illuminator storage compartment 32 at main points of the inter-compartment portion 33 corresponding to the positions of the pin insertion openings 21. More specifically, at least one notch 15 is formed so as to obtain a positional relationship in which a line obtained by extending the center line of the pressing pin 22 that is inserted through the pin insertion opening 21 and operated passes through the notch 15. In this embodiment, as shown in FIG. 1, the pin insertion openings 21 and the notches 15 corresponding thereto are formed at three points consisting of positions near both ends in the longitudinal direction of the frame 12 and a position near the center. Here, the frame 12 according to this embodiment is formed by injection molding of a black polycarbonate resin in which fibers are reinforced.

Figure 7:
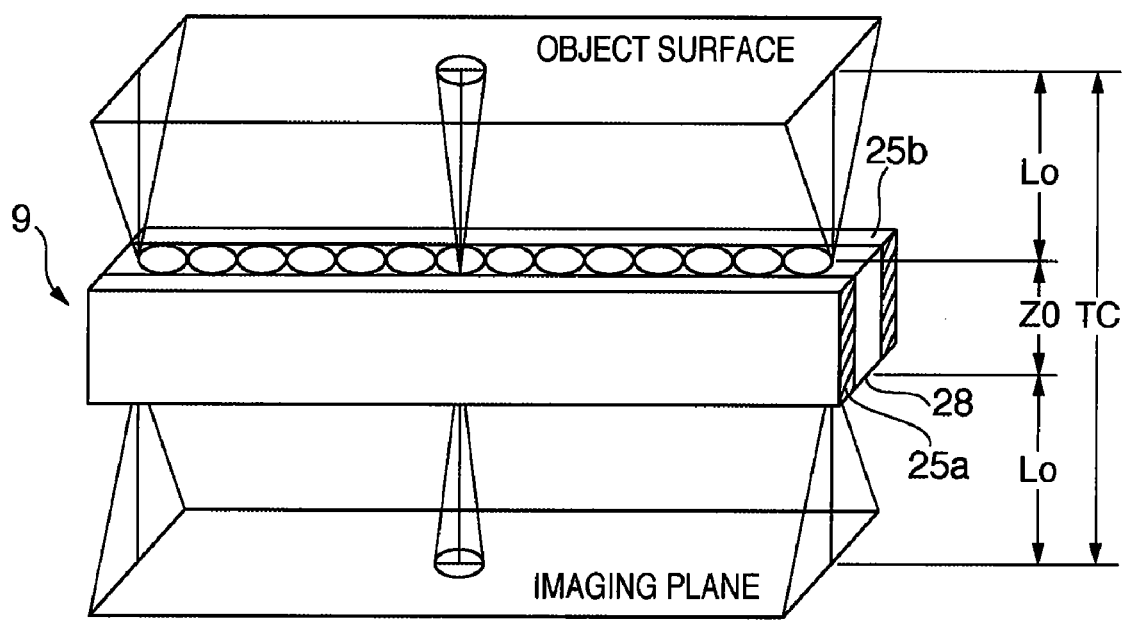
FIG. 7 depicts a view illustrating the relationship between a conjugate length of the rod lens array, a distance from the rod lens array to an image point, and a height of the rod lens array.

FIG. 7 is a view illustrating the relationship between a conjugate length (TC) of the rod lens array 9, a distance (L0) from the rod lens array 9 to an image point, and a height (Z0) of the rod lens array 9.

In the CIS unit 1 or the image-reading apparatus according to this embodiment, the positions of an object surface and an imaging plane in FIG. 7 are positioned respectively so as to be the reading line 4 of the document 2 and a light-receiving face of the light-receiving sensor 10, and, thus, the imaging performance of the rod lens array 9 is secured. Furthermore, the rod lens array 9 is formed such that, as shown in FIGS. 1 and 7, a plurality of rod lenses are arranged along the reading line and have the same length in their optical path direction. The plurality of rod lenses are configured so as to be held by a pair of side plates 25a and 25b consisting of the above-described second side plate and a first side plate.

Hereinafter, the structure of the frame 12 and a method of assembling the rod lens array 9 using the structure in Embodiment 1 will be described.

Figure 4:
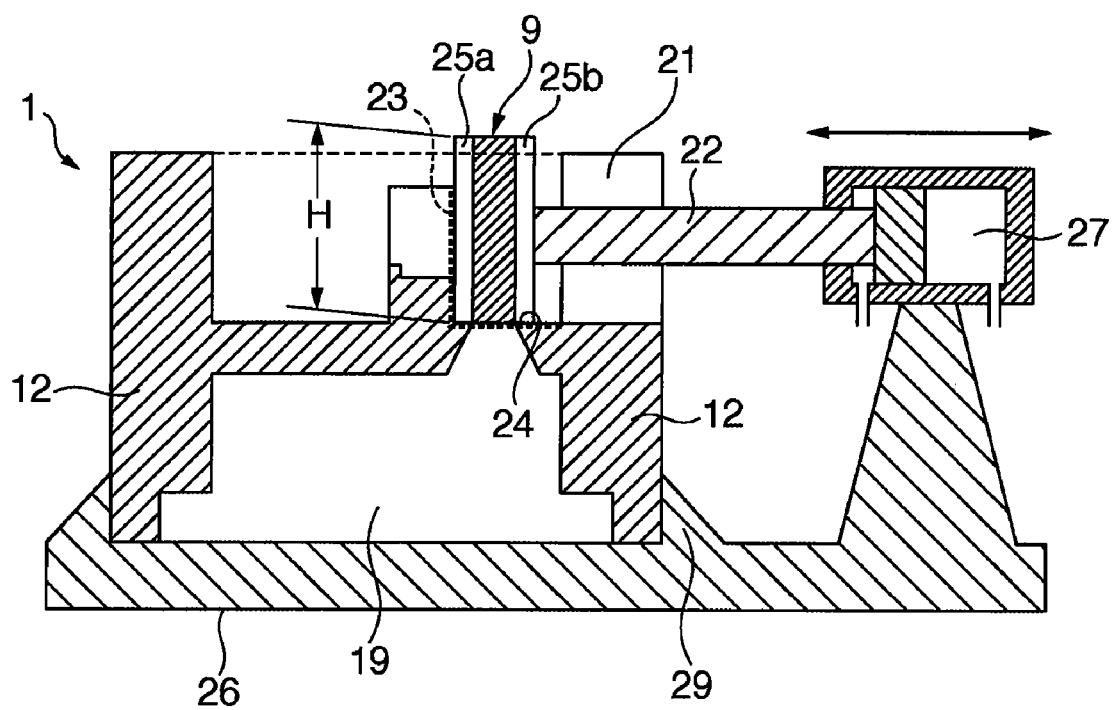
FIG. 4 depicts a conceptual cross-sectional view illustrating a method in which the side plate of the rod lens array is pressed by a pressing pin and brought into close contact with a vertical reference face of the frame in this embodiment.

FIG. 4 is a conceptual cross-sectional view illustrating an operation in which the first side plate 25b of the rod lens array 9 is pressed by the pressing pin 22, and the second side plate 25a is brought into close contact with the vertical reference face 23 of the frame 12 according to this embodiment.

As shown in FIG. 4, the pressing pin 22 is inserted through the pin insertion opening 21 by operating a cylinder 27 of the assembling jig 26. Accordingly, the pressing pin 22 passes through the pin insertion opening 21 and presses the first side plate 25b of the rod lens array 9 stored in the lens storage compartment 14. Here, in the case where this operation is started after the frame 12 is set at a frame-fixing portion 29 of the assembling jig 26, insertion and positional adjustment of the pressing pin 22 can be reliably performed.

Furthermore, the pressing pin 22 is a round bar that presses substantially the center of a height H of the rod lens array 9 and that has a diameter approximately ⅓ the height H. The pressing force in this case is approximately 0.15 [kgf/cm$^2$].

In this embodiment, the front end face of the pressing pin 22 is flat. However, the present invention is not limited to this, and, for example, a spherical face with a large curvature is also preferable because it can press the rod lens array 9 without any damage.

Next, the procedure for fixing and positioning the rod lens array 9 on the frame 12 in this embodiment will be described with reference to FIGS. 3 to 5. Here, the rod lens array 9 is the first component mounted on the frame 12, and, in this state, components such as the linear illuminator 6, the light-receiving sensor 10, and the printed circuit board 11 have not been mounted yet.

FIG. 3 is a conceptual cross-sectional view illustrating an operation in which the rod lens array 9 in this embodiment is inserted into the lens storage compartment 14 disposed in the frame 12.

Figure 5:
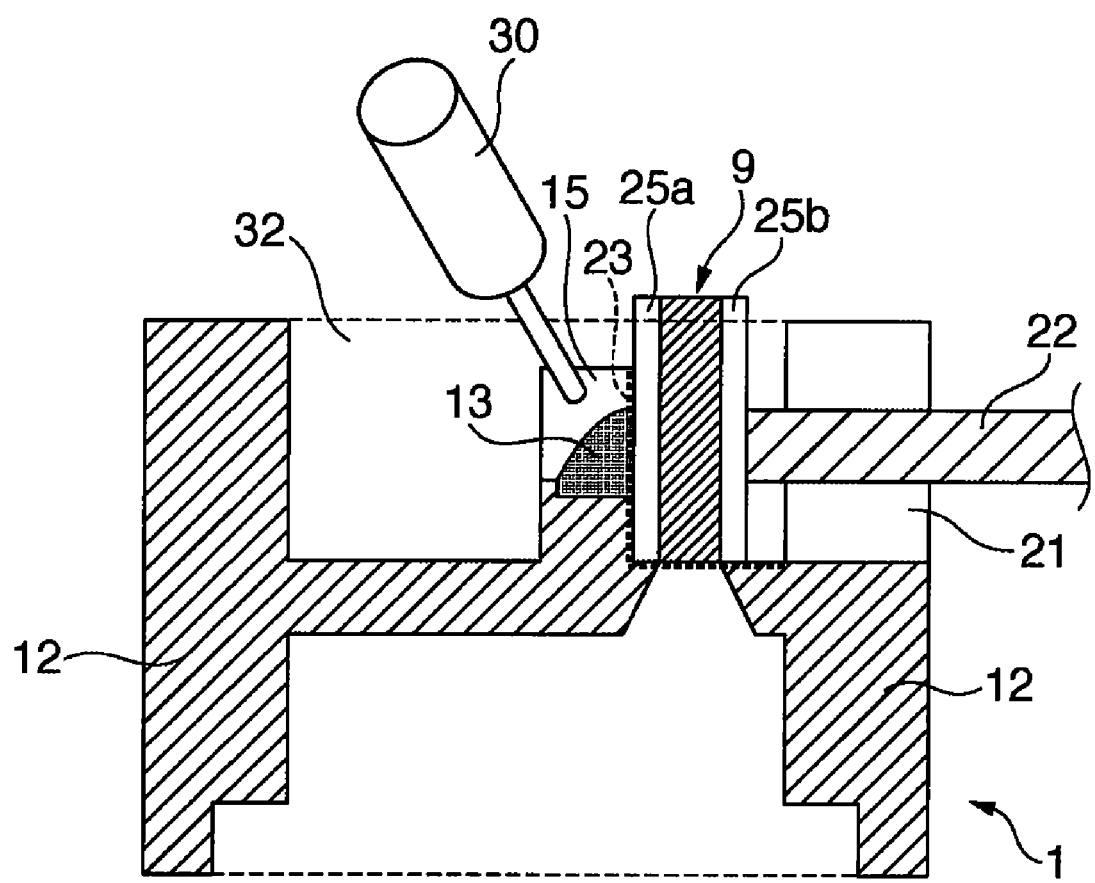
FIG. 5 depicts a conceptual cross-sectional view illustrating a method in which an adhesive is applied via a notch to the side plate of the rod lens array in this embodiment.

FIG. 5 is a conceptual cross-sectional view illustrating an operation in which an adhesive is applied from the notches 15 to the second side plate 25a of the rod lens array 9 in this embodiment. Here, in FIGS. 3 to 5, constituent elements similar to those in the above-shown drawings are denoted by the same reference numerals, and a description thereof is omitted. Hereinafter, a method of manufacturing the CIS unit 1 according to this embodiment will be described in detail together with the structure of the frame.

(1) First, as shown in FIG. 4, a dedicated assembling jig 26 for reliably fixing the rod lens array 9 to the frame 12 is prepared. Then, the frame 12 is set at the frame-fixing portion 29 of the assembling jig 26.

(2) As shown in FIG. 3, the rod lens array 9 is inserted from above and stored in the lens storage compartment 14 of the frame 12. Here, the lens storage compartment 14 is formed such that the size between its inner walls in the cross-sectional direction is larger than the thickness (in the cross-sectional direction) of the rod lens array 9.

(3) Next, as shown in FIG. 1, three pressing pins 22 corresponding to three pin insertion openings 21 are inserted into the pin insertion openings 21 and moved forward by simultaneously operating three cylinders 27. Accordingly, the second side plate 25a of the rod lens array 9 is brought into close contact with the vertical reference face 23 where the pin insertion openings 21 reach when extended (see FIG. 4). At that time, as shown in FIG. 1, the notches 15 where an adhesive is supplied and applied are arranged on the vertical reference face 23 at points where the pressing pins 22 reach when extended in the travel direction. Accordingly, the vertical reference face 23 around the notches 15 and the rod lens array 9 are properly brought into contact with each other.

(4) Furthermore, the upper face of the rod lens array 9 is sequentially lightly tapped from one end to the other end in the longitudinal direction to be pressed downward such that the entire under surface 28 in longitudinal direction of the rod lens array 9 is brought into close contact with the horizontal reference face 24.

(5) In this manner, a state is obtained in which, as shown in FIG. 4, the second side plate 25a of the rod lens array 9 is in close contact with the vertical reference face 23, and the under surface 28 of the rod lens array 9 is in close contact with the horizontal reference face 24. After this state is secured, an adhesive 13 for fixing the frame 12 and the rod lens array 9 is used. As shown in FIG. 5, the adhesive 13 is applied using a dispenser 30 or the like so as to cover the second side plate 25a of the rod lens array 9 exposed through the notch 15. Furthermore, the adhesive is applied also to a bottom face 34, which is one of inner walls of the notch 15, and the adhesive 13 in the shape of a block as shown in FIGS. 1 and 2 is formed. The adhesive 13 used in this embodiment is an ultraviolet-curable adhesive, which is advantageous in curing time, curing temperature, and the like.

(6) Subsequently, ultraviolet rays are irradiated via a light guide of an ultraviolet spot irradiation apparatus to cure the applied adhesive 13.

(7) In this manner, the adhesive 13 is cured, and the rod lens array 9 is fixed to the frame 12. Subsequently, the cylinders 27 of the assembling jig 26 are operated to move the pressing pins 22 backward, the frame 12 is removed from the frame-fixing portion 29, and the assembly operation of the rod lens roughly ends.

In the steps (5) and (6) of the assembly operation, an important point of the notches 15 that are places where the adhesive 13 is applied, in which this embodiment is characteristic, is that the notches open on the side of the linear illuminator storage compartment 32 in the inter-compartment portion 33. That is to say, the operations that use tools, such as the dispenser 30 (see FIG. 5) for supplying and applying the adhesive 13 to the notches 15, a flexible light guide (not shown) from an ultraviolet spot irradiation apparatus for curing the applied ultraviolet-curable adhesive 13, or the like can be performed using a space of the linear illuminator apparatus storage compartment 32 before a storage target is stored. This embodiment is characteristic in that a space sufficient for movement and direction changes in achieving the usage objects of these tools can be secured, and in that the steps (5) and (6) of the operation are easy to perform more efficiently and to automate.

Furthermore, the position and the structure of the notches 15 are set so as to secure a working space in which ultraviolet rays irradiated from the light guide reach all of the ultraviolet-curable adhesive applied to the notches 15. Accordingly, the amount of residual uncured adhesive is reduced, and the adhesive can be economically used. As a result, the adhesive is sufficiently cured at the bottom faces 34 of the notches 15 and the side plate 25a of the rod lens array 9 functioning as adhesion faces, and the rod lens array 9 can be fixed to the frame 12 with good positional precision.

When the finished state of the CIS unit 1 assembled using the frame 12 according to this embodiment was confirmed, it was found that the applied adhesive 13 was firmly adhered and cured at the second side plate 25a exposed through the notches 15 and the bottom faces 34 of the notches 15 functioning as adhesion faces, and that the rod lens array 9 was fixed to the frame 12 with good positional precision.

Furthermore, it was not found that an uncured adhesive permeated through a gap between the vertical reference face 23 or the horizontal reference face 24 and the rod lens array 9, or that an adhesive flowed so as to cover the lens surface at the under surface 28 of the rod lens array 9. That is to say, the rod lens array 9 and the frame 12 are in close contact with each other and fixed in a state where the adhesive 13 does not enter between the vertical reference face 23 and the side plate 25*a*. Furthermore, it was confirmed that the amount of stray light traveling from the lens storage compartment 14 into an area 19 (FIG. 2) storing the light-receiving sensor 10 without passing through the rod lens array 9 was negligible, and that the rod lens array 9 was in sufficiently close contact with the horizontal reference face 24.

Furthermore, in the assembly operation, the step of bringing the rod lens array 9 into contact with the vertical reference face 23 is performed using the pressing pins 22 that are inserted through the pin insertion openings 21 according to this embodiment, so that the side plate 25*a* of the rod lens array 9 can be properly brought into close contact with the vertical reference face 23.

Figure 9:
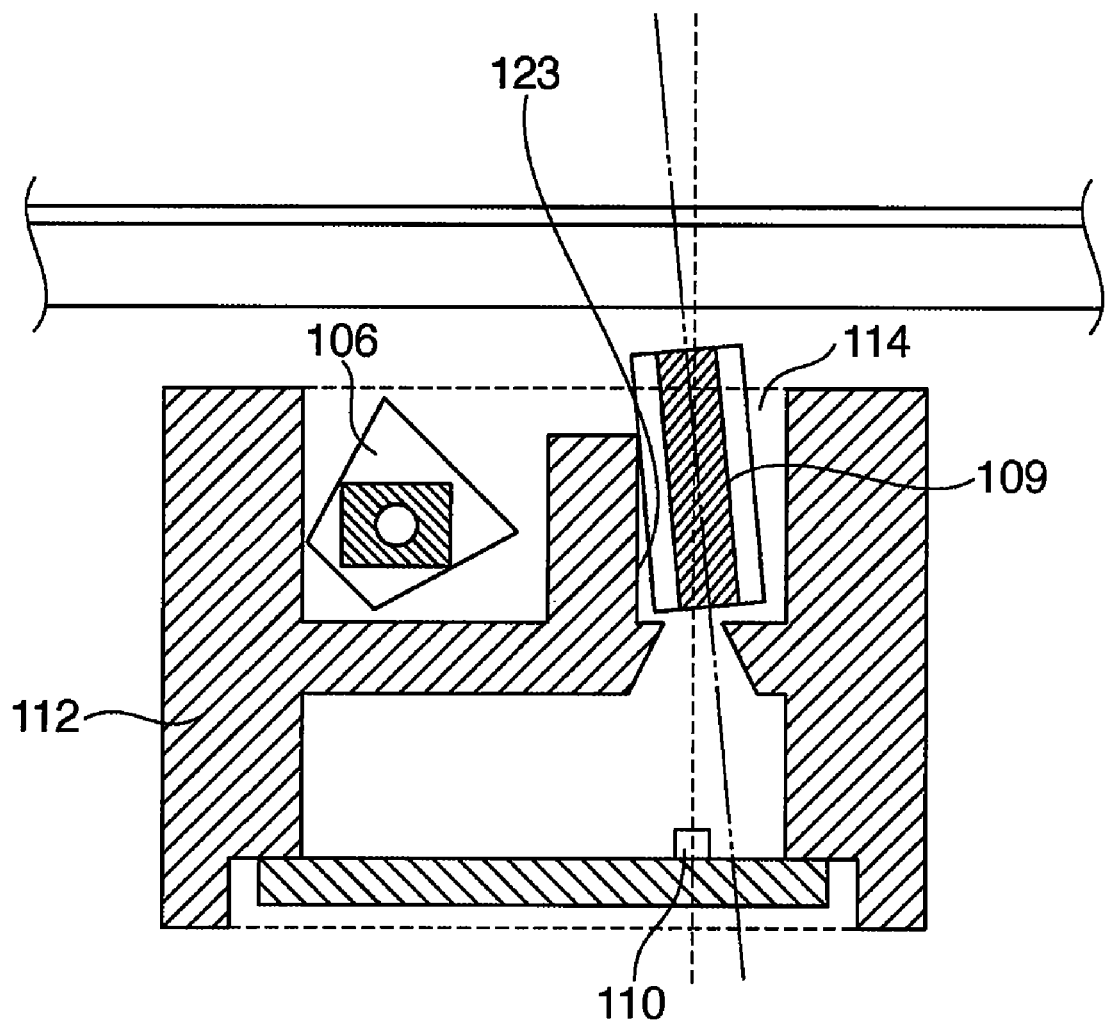
FIG. 9 depicts a conceptual cross-sectional view illustrating an example in which a rod lens array cannot be properly fixed to a frame.

FIG. 9 is a conceptual cross-sectional view illustrating a conventional example in which a rod lens array cannot be properly fixed to a frame.

In FIG. 9, a working space for properly pressing and supporting a rod lens 109 on a reference face 123 is not secured in a lens storage compartment 114 or thereabout. Accordingly, the rod lens array 109 is assembled at an angle with respect to the reference face 123. In FIG. 9, numeral 106 denotes a linear illuminator, numeral 112 denotes a frame, and numeral 110 denotes a light-receiving sensor.

Conversely, in this embodiment, this sort of problem in which the rod lens array 109 is fixed at an angle with respect to the reference face 123 can be eliminated. Furthermore, in this embodiment, it was verified that the assembly operation can be performed without a spring member or the like for supporting the rod lens array.

The frame 12 of the CIS unit 1 according to this embodiment is formed by injection molding of a resin, but the frame may be obtained by processing other materials, such as a molded product made of an aluminum metal. The reason for this is that this embodiment is characteristic in that the pin insertion openings 21 and the notches 15 are arranged at appropriate positions and functionally used. It will be appreciated that a frame made of a polycarbonate resin is excellent in moldability and work efficiency.

Figure 8:
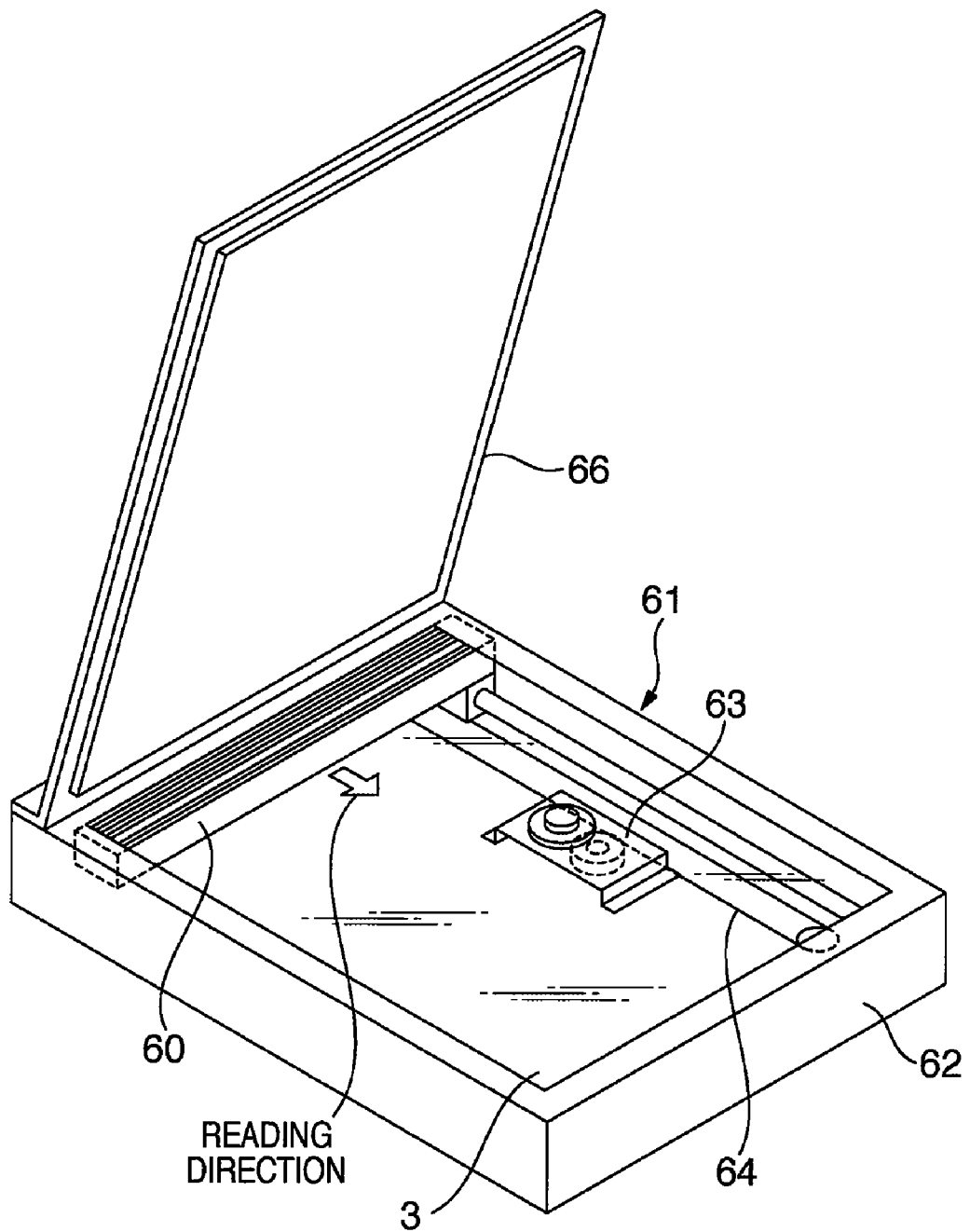
FIG. 8 depicts an external perspective view illustrating an example of an image-reading apparatus in which a CIS unit according to this embodiment is assembled.

Next, the completed CIS unit 1 on which necessary components were mounted was assembled in an image-reading apparatus 61 of this embodiment shown in FIG. 8, and the quality of a read image was evaluated.

FIG. 8 depicts an external perspective view illustrating an example of an image-reading apparatus in which a CIS unit according to this embodiment is assembled.

The image-reading apparatus 61 according to this embodiment is a flat-bed-type image scanner in which a CIS unit 60 according to this embodiment is assembled. In the image-reading apparatus, the CIS unit 60 according to the present invention is mounted inside a casing 62. Furthermore, the casing 62 includes a drive motor 63 and a wire 64 for moving the CIS unit. Furthermore, a transparent cover glass 3 is attached as a document support to an upper face of the casing 62. Furthermore, a pressure plate 66 that presses a document is assembled in an openable and closable manner at an end portion of the casing 62.

In the thus-configured image-reading apparatus 61 according to this embodiment, a document is placed face-down on the transparent cover glass 3, the pressure plate 66 is closed, the drive motor 63 is driven, and the wire 64 is mechanically moved. As a result, the CIS unit 60 is moved in a reading direction (sub-scanning direction) such that the CIS unit 60 and the document move relative to each other, and the document is read. In this manner, image information on the document is output as electronic information.

Electronic information output from the image-reading apparatus 61 of this embodiment was printed by an ink jet printer, and the quality as an image-reading apparatus was confirmed. As a result, problems relating to, for example, a positional difference between the optical axis 5 and the optical path line 18 (FIG. 2) due to inclination of the rod lens array 9, a decrease in the amount of light reaching the light-receiving sensor 10 due to such a positional difference, and a positional difference between an imaging focal point and a light-receiving position of the light-receiving sensor 10 were not found. Accordingly, it was found that a CIS unit and an image-reading apparatus with a sufficiently high image quality can be provided.

Next, a state of the position of the notch 15 that is used for applying the adhesive 13 will be described with reference to an embodiment indicated by B in FIG. 1. The notch 15 indicated by B is formed at a position that is not on a line obtained by extending the center line of the pressing pin 22. That is to say, a position pressed by the pressing pin 22 is not the position of the notch 15. In the case of the notch 15 having this sort of positional relationship, not the notch 15 but the vertical reference face 23 of the lens storage compartment 14 is present on a line obtained by extending the pressing pin 22 in the pressing direction. Accordingly, a more intense pressing force given by the pressing pin 22 can be sufficiently received. Accordingly, an advantage is obtained in which deformation of the rod lens array 9 in the pressing direction due to the pressing pin 22 can be suppressed.

Figure 10B:
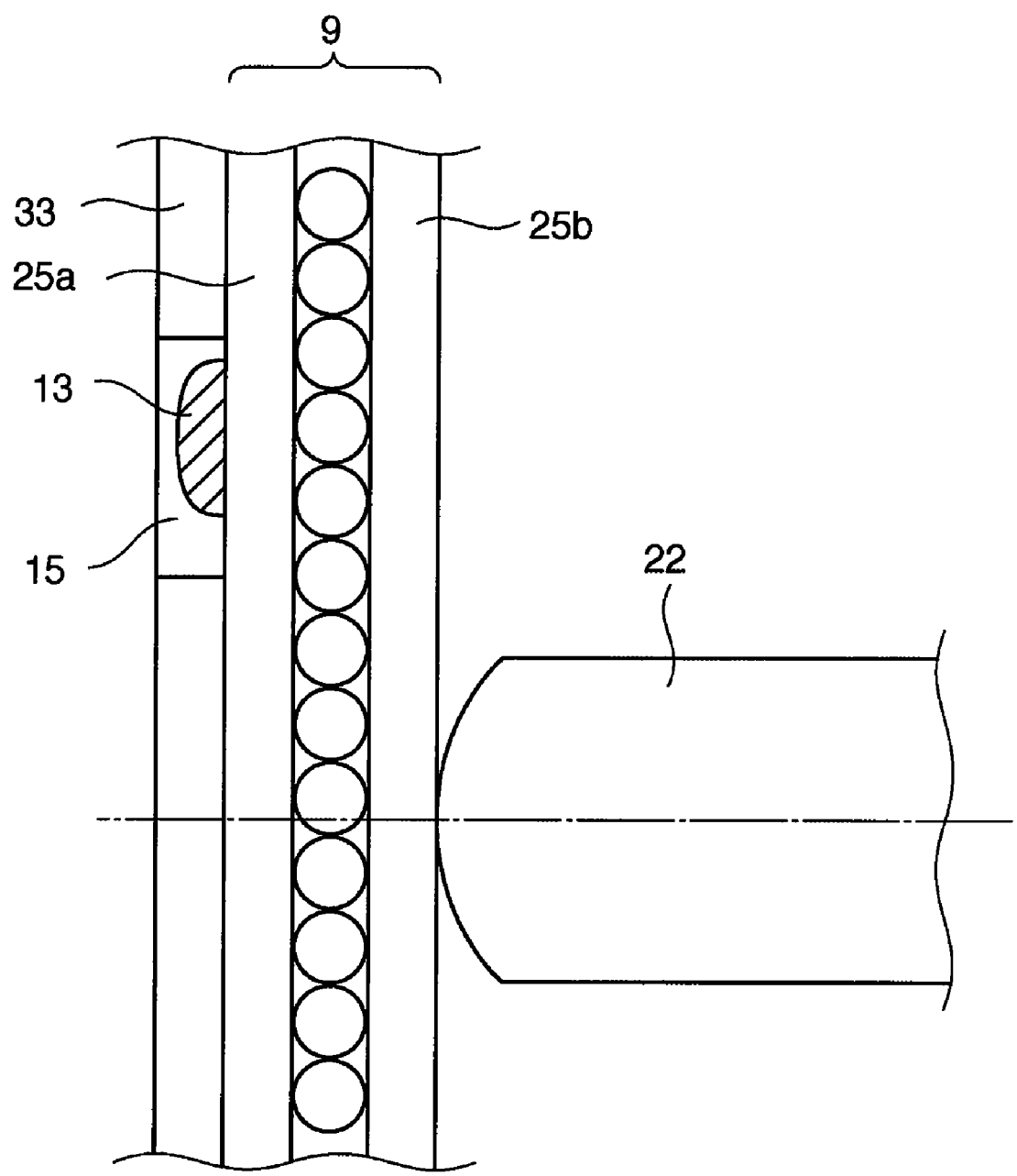
Figure 11A:
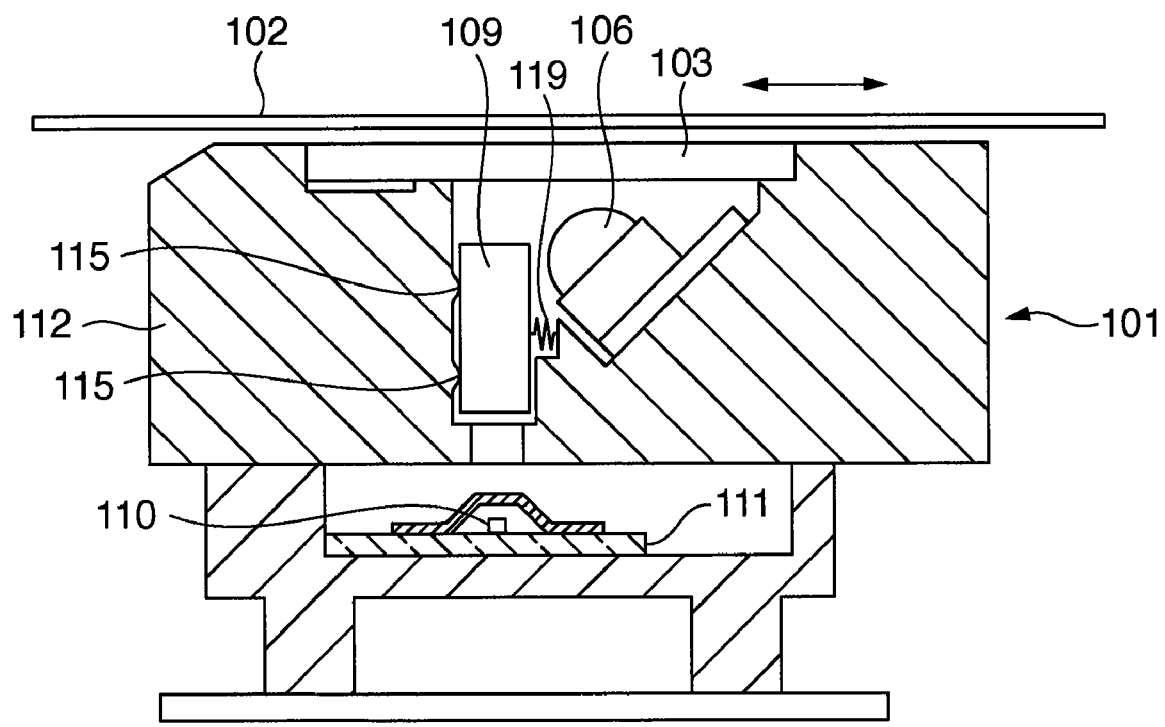
FIGS. 11A and 11B depict views showing a cross-section of a CIS unit according to a conventional technology using a spring.
Figure 11B:
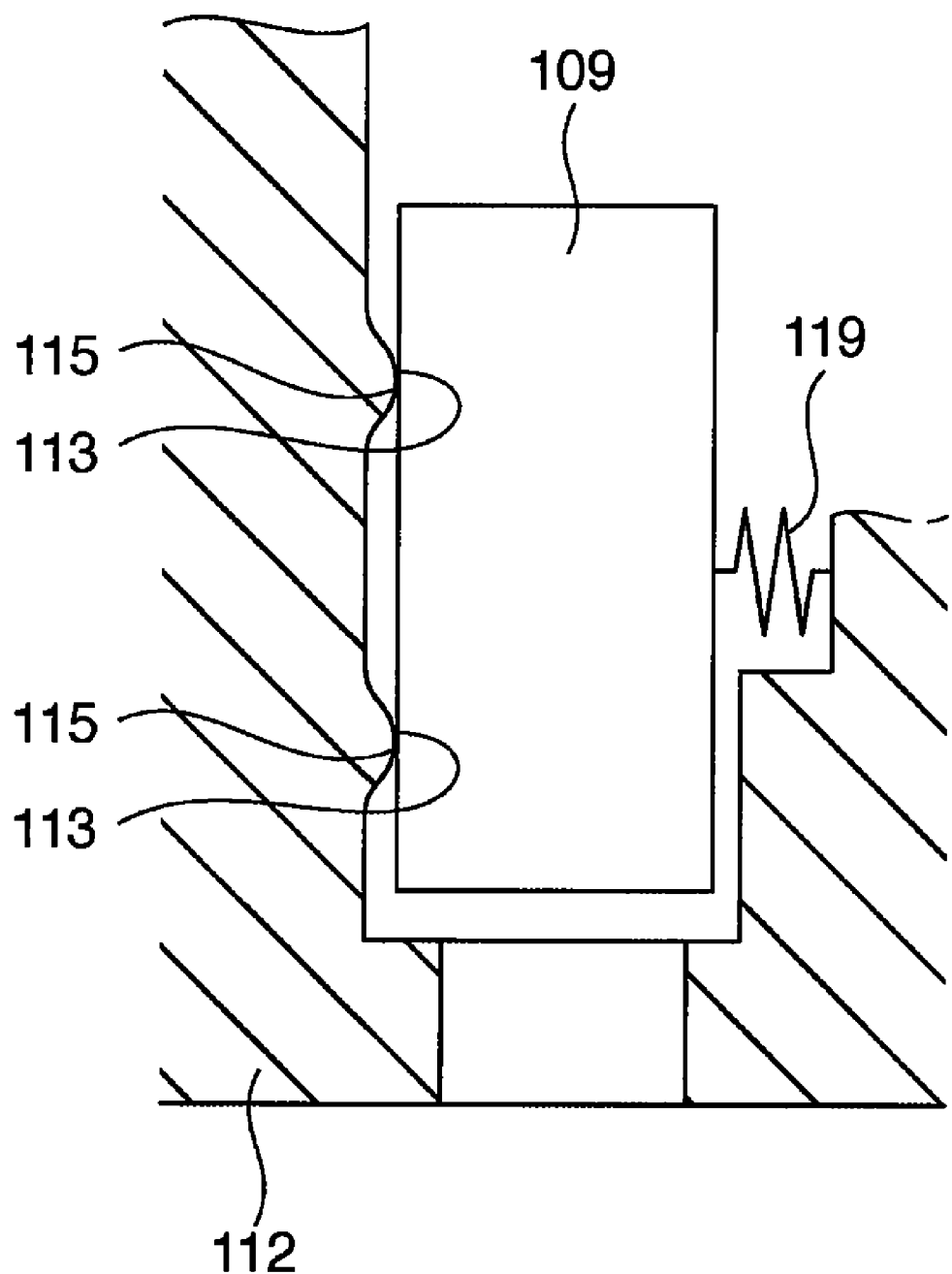

FIGS. 10A and 10B are views illustrating the positional relationship between a position at which the pressing pin is in contact with the rod lens array, and the notch.

FIG. 10A shows the case in which the notch 15 is positioned on a line obtained by extending the pressing pin 22. In this case, when pressing by the pressing pin 22 is improperly performed, the rod lens array 9 is curved, and a gap as indicated by 71 may be formed at a portion that is to be in close contact.

FIG. 10B shows the case of the portion defined by B in FIG. 1, and the problem in which the gap 71 is formed as shown in FIG. 10A is reduced. Thus, the notch 15 formed in the portion indicated by B in FIG. 1 is also encompassed by the scope of the present invention.

Figure 6:
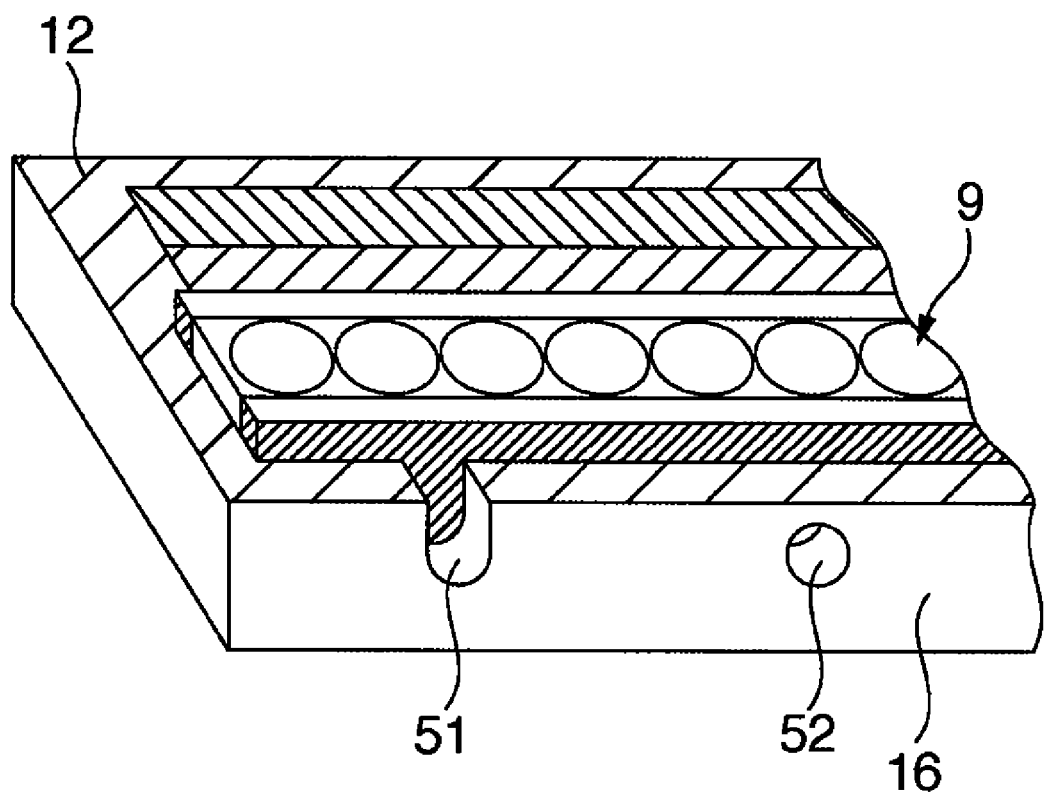
FIG. 6 depicts a conceptual view illustrating another shape of a pin insertion opening according to this embodiment.

FIG. 6 is a view illustrating another shape of the pin insertion opening according to this embodiment. The shape of the pin insertion opening 21 in the foregoing embodiment is such that the pin insertion opening extends from the side face 16 of the frame 12 to the lens storage compartment 14 and is open also above the frame 12, as indicated by reference numeral 51. However, the shape of the pin insertion opening of the present invention is not limited to this shape, and may be, for example, a circular hole as indicated by reference numeral 52 or a square hole (not shown).

In this embodiment, the example is described in which the rod lens array 9 with a length corresponding to a contact-type image sensor unit that scans and reads an A4-sized width (approximately 220 mm) is fixed with the pressing pins 22 at three points consisting of a position near the center in the longitudinal direction and positions near both ends. However, the number of points is not limited to this, and the number may be less than three points or may be more than three points.

Furthermore, the position and the number may be selected such that the rod lens array 9 can be properly brought into close contact with and fixed to the vertical reference face 23, in consideration of the rigidity of the rod lens array 9, the structure of a portion around the lens storage compartment 14 disposed in the frame 12, and the like, and at least one point need only be provided.

Furthermore, the image-reading apparatus according to this embodiment is not limited to an image scanner, and may be used in a copying machine or a facsimile in which the CIS unit according to this embodiment is assembled.

The present invention is not limited to the above-described embodiments, and various changes and modifications can be made within the spirit and scope of the present invention. Therefore, to apprise the public of the scope of the present invention, the following claims are made.

DESCRIPTION OF THE REFERENCE NUMERALS 1, 60: Contact-type Image Sensor (CIS unit)
2: Document
9: Rod lens array
10: Light-receiving sensor
11: Printed circuit board
12: Frame
13: Adhesive
14: Lens storage compartment
15: Notch
17: Inner wall of lens storage compartment opposing inter-compartment portion
21: Pin insertion opening
22: Pressing pin
23: Vertical reference face
24: Horizontal reference face
25a, 25b: Second and first side plates of rod lens array
28: Under surface of rod lens array
32: Linear illuminator storage compartment
33: Inter-compartment portion
34: One bottom face as inner face of notch
61: Image-reading apparatus

The invention claimed is:

1. An image sensor unit having a frame storing: a linear illuminator that linearly illuminates a document; a rod lens array that is used to form an image of light reflected from the document irradiated by the linear illuminator; and a printed circuit board on which a light-receiving sensor that converts light whose image has been formed by the rod lens array into an electrical signal is mounted;

wherein, in the frame, a lens storage compartment and a linear illuminator storage compartment that are formed for respectively storing and fixing the rod lens array and the linear illuminator are adjacently arranged substantially in parallel to each other in a longitudinal direction, with an inter-compartment portion formed in the frame interposed therebetween, at least one pin insertion opening is formed that extends from an inner wall of the lens storage compartment opposing the inter-compartment portion into an outside of the frame and through which a pressing pin is inserted, and in the inter-compartment portion, a face defining the lens storage compartment is formed as a vertical reference face with which a side plate of the rod lens array is brought into close contact for fixing, and a notch that is used for applying an adhesive to the side plate of the rod lens array and that is disposed corresponding to the pin insertion opening is formed so as to be open from the lens storage compartment to the linear illuminator storage compartment.

2. The image sensor unit according to claim 1, wherein the side plate of the rod lens array is brought into close contact with the vertical reference face by the pressing pin that is inserted through the pin insertion opening, and an inner wall of the notch and a portion of the side plate exposed through the notch functioning as adhesion faces are fixed with an adhesive.

3. The image sensor unit according to claim 1, wherein a bottom face of the lens storage compartment is formed as a horizontal reference face with which an under surface of the side plate of the rod lens array is brought into contact for positioning in a focal point direction.

4. The image sensor unit according to claim 1, wherein the notch is formed on a line obtained by extending a center line of the pin insertion opening.

5. The image sensor unit according to claim 1, wherein the notch is formed at a position that is not on a line obtained by extending a center line of the pin insertion opening.

6. An image-reading apparatus, comprising the image sensor unit according to claim 5, in which the frame is made of a polycarbonate resin, wherein the image sensor unit and a document are moved relative to each other to read an image on the document.

7. A method of manufacturing an image sensor unit having a frame storing a linear illuminator that linearly illuminates a document, a rod lens array that is used to form an image of light reflected from the document irradiated by the linear illuminator, and a light-receiving sensor that converts light whose image has been formed by the rod lens array into an electrical signal, comprising:

in the frame, adjacently arranging a lens storage compartment and a linear illuminator storage compartment that are formed for respectively storing and fixing the rod lens array and the linear illuminator, substantially in parallel to each other in a longitudinal direction, with an inter-compartment portion formed in the frame interposed therebetween;

storing the rod lens array in the lens storage compartment, and then pressing a first side plate of the rod lens array with a pressing pin inserted through a pin insertion opening that extends from an inner wall of the lens storage compartment opposing the inter-compartment portion into an outside of the frame and that is disposed such that the pressing pin is inserted therethrough;

bringing a second side plate of the rod lens array into close contact with a vertical reference face that is a face of the inter-compartment portion defining the lens storage compartment and holding the second side plate; and fixing an inner wall of a notch, wherein the notch is used for applying an adhesive to the second side plate of the rod lens array and is disposed corresponding to the pin insertion opening and is formed so as to be open from the lens storage compartment to the linear illuminator storage compartment, and a portion of the second side plate exposed through the notch with the adhesive.

* * * * *